United States Patent [19]
Okuzumi et al.

[11] Patent Number: 5,203,740
[45] Date of Patent: Apr. 20, 1993

[54] DRIVE SHAFT ASSEMBLY

[75] Inventors: Hiroshi Okuzumi, Ithaca, N.Y.; Yoshinori Hirano, Kanagawa, Japan

[73] Assignee: Nissan Motor Co., Ltd., Japan

[21] Appl. No.: 646,542

[22] Filed: Jan. 28, 1991

[30] Foreign Application Priority Data
Jan. 29, 1990 [JP] Japan .................... 2-18184

[51] Int. Cl.$^5$ .................... F16D 3/76; F16C 3/02
[52] U.S. Cl. .................... 464/89; 464/180
[58] Field of Search .................... 464/180, 89; 73/468; 74/573 R

[56] References Cited
U.S. PATENT DOCUMENTS

| | | | |
|---|---|---|---|
| 4,385,897 | 5/1983 | Mallet | 464/89 |
| 4,406,640 | 9/1983 | Franklin et al. | 464/89 X |
| 4,548,591 | 10/1985 | Haldric et al. | 464/89 |
| 4,552,544 | 11/1985 | Beckman et al. | 464/180 X |
| 4,614,506 | 9/1986 | Sakata | 464/180 X |
| 4,667,530 | 5/1987 | Mettler et al. | 464/89 X |
| 4,887,989 | 12/1989 | Kerecman | 464/180 |
| 4,895,551 | 1/1990 | Fritz | 464/180 |

FOREIGN PATENT DOCUMENTS

| | | |
|---|---|---|
| 2104566 | 9/1971 | Fed. Rep. of Germany. |
| 3906115 | 2/1989 | Fed. Rep. of Germany. |
| 3844031 | 7/1989 | Fed. Rep. of Germany. |

OTHER PUBLICATIONS

A. Ehrhardt U.H. Franne (Hgb.): Lueger Lexikon der Technik; Maschinenbau-Grundlagen, Band 1, Reinbek bei Hamburg, Oct. 1971; p. 24.

Dubbels Taschenbush fur den Maschinenbau, 12. Auflage, Neudruck 1966, Band 1, Springer-Verlag Berlin/Heidelberg/New York 1966; pp. 258, 259.

Nissan Service Bulletin, No. 603 (AA1-1), Sep. 1988, p. C-46.

"Shinpen Jidosha Kogaku Binran", *Society of Automotive Engineers of Japan*, vol. 5, Chapter 1, Part 4, pp. 25-29, Jun. 1987.

*Primary Examiner*—Daniel P. Stodola
*Assistant Examiner*—William G. Battista, Jr.
*Attorney, Agent, or Firm*—Lowe, Price, LeBlanc & Becker

[57] ABSTRACT

A two piece type drive (propeller) shaft assembly comprises first and second shafts and a middle elastic member which resiliently connects the first and second shafts end to end so that power can be transmitted. At least one weight is fixed to each shaft at a predetermined unbalance position to shift a principal axis of inertia of the shaft to a desired orientation to suppress whirling motion of the shaft. In each shaft, the at least one weight is located at such a position that the distance of the unbalancing at least one weight from the connected end of the shaft is substantially equal to one third of length of the shaft.

14 Claims, 4 Drawing Sheets

DRIVE SHAFT ASSEMBLY

BACKGROUND OF THE INVENTION

The present invention relates to drive shafts or propeller shafts which are designed to suppress whirling vibrations, and more specifically to two-piece type (or three-joint type) drive shafts for transmitting power from an engine or motor of a vehicle toward driving wheels in such a manner as to reduce undesired vibrations and noises.

FIG. 6 shows one conventional drive shaft assembly for a motor vehicle. Various drive shaft assemblies are shown in "Shinpen Jidosha Kogaku Binran" (June, 1987; Society of Automotive Engineers of Japan), vol. 5, chapter 1, part 4 (pages 25~29). The drive shaft assembly shown in FIG. 6 is a three-joint type assembly, and includes first and second shaft tubes 12 and 13, and three universal joints 14, 15 and 16, such as Cardan joints. Both shaft tubes 12 and 13 are connected end to end by the middle joint 16. A center bearing 17 is provided to support an intermediate portion of said first shaft tubes 12 to a vehicle body.

The drive shaft is a long part rotating at high speeds. Therefore, the drive shaft lacking rotating balance causes serious vibration and noise problems. The shaft unbalance is usually corrected by measuring an amount of unbalance with a dynamic balance test equipment, and attaching a balance weight to the shaft at a proper position. However, it is practically impossible to make a completely balanced shaft whose axis of inertia is coincident with the center axis of the shaft.

SUMMARY OF THE INVENTION

It is therefore an object of the present invention to provide a drive (propeller) shaft assembly which can suppress whirling movements even if there remains some unbalance.

According to the present invention, a drive (propeller) shaft assembly comprises first and second shafts, a connecting means, and first and second unbalancing means. Each of the first and second shafts has first and second ends, and axially extends from the first end to the second end. The connecting means is a means for resiliently connecting the first ends of said first and second shafts with each other so that power can be transmitted from the first shaft to the second shaft and vice versa. The first unbalancing means is fixed to the first shaft, and located at a first unbalance position of the first shaft. The second unbalancing means is fixed to the second shaft, and located at a second unbalance position of the second shaft. The first unbalance position is radially spaced from the center axis of the first shaft, and intermediate between the first end of the first shaft and a middle of the first shaft. The middle of the first shaft is equally distant from the first and second ends of the first shaft. The first unbalance position is separated from the middle of the first shaft by a predetermined distance. Preferably, this distance is smaller than a distance between the first unbalance position and the first end of the first shaft. The second unbalance position is determined in the same manner. The second unbalance position is radially spaced from the center axis of the second shaft, and intermediate between the first end of the second shaft and a middle of the second shaft which is separated from the first and second ends of the second shaft by equal distances. The second unbalance position is separated from the middle of the second shaft by a predetermined distance. Preferably this distance is smaller than a distance between the second unbalance position and the first end of the second shaft.

Preferably, each of the first and second unbalancing means is placed in or near a trisecting plane which is perpendicular to the center axis of the shaft and which is separated from the first end of the shaft by a distance equal to one third of the length of the shaft.

BRIEF DESCRIPTION OF THE DRAWINGS

FIGS. 3A and 3B show a principal axis of inertia of a hollow cylinder having an unbalance. FIGS. 4A and 4B show the center of gravity of the hollow cylinder shown in FIGS. 3A and 3B. FIG. 5 is a graph showing a relationship between the position of the unbalance and the deviation of the principal axis of inertia.

DETAILED DESCRIPTION OF THE INVENTION

Figure 1:
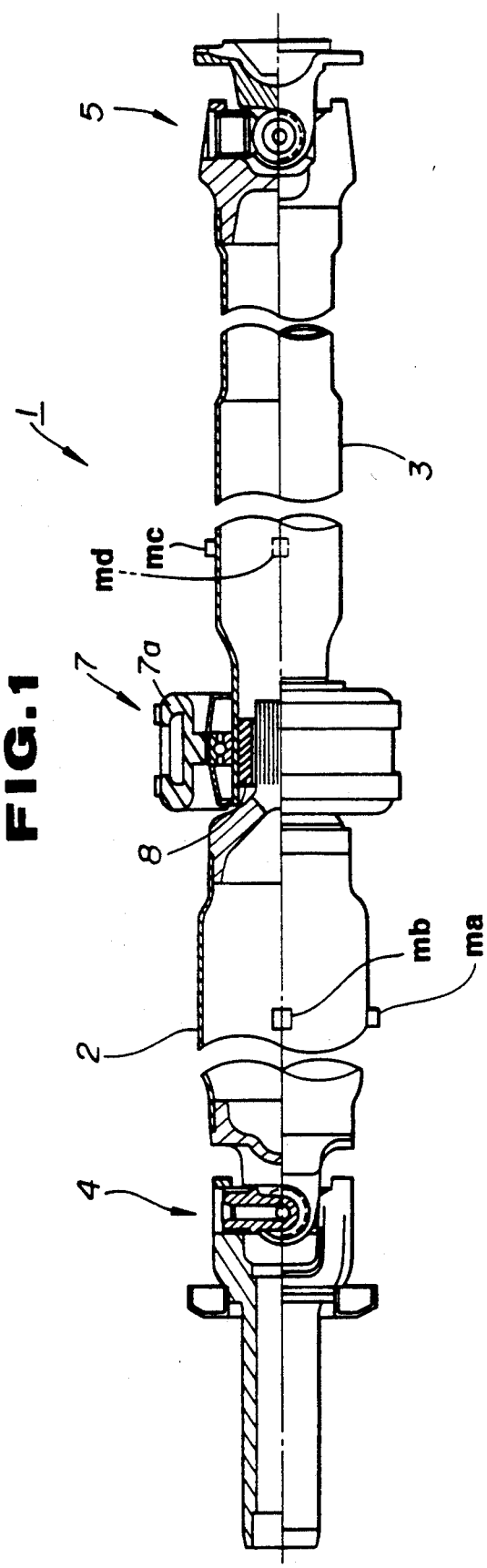
FIG. 1 is a view showing, partly in section, a drive shaft assembly according to one embodiment of the present invention.
Figure 6:
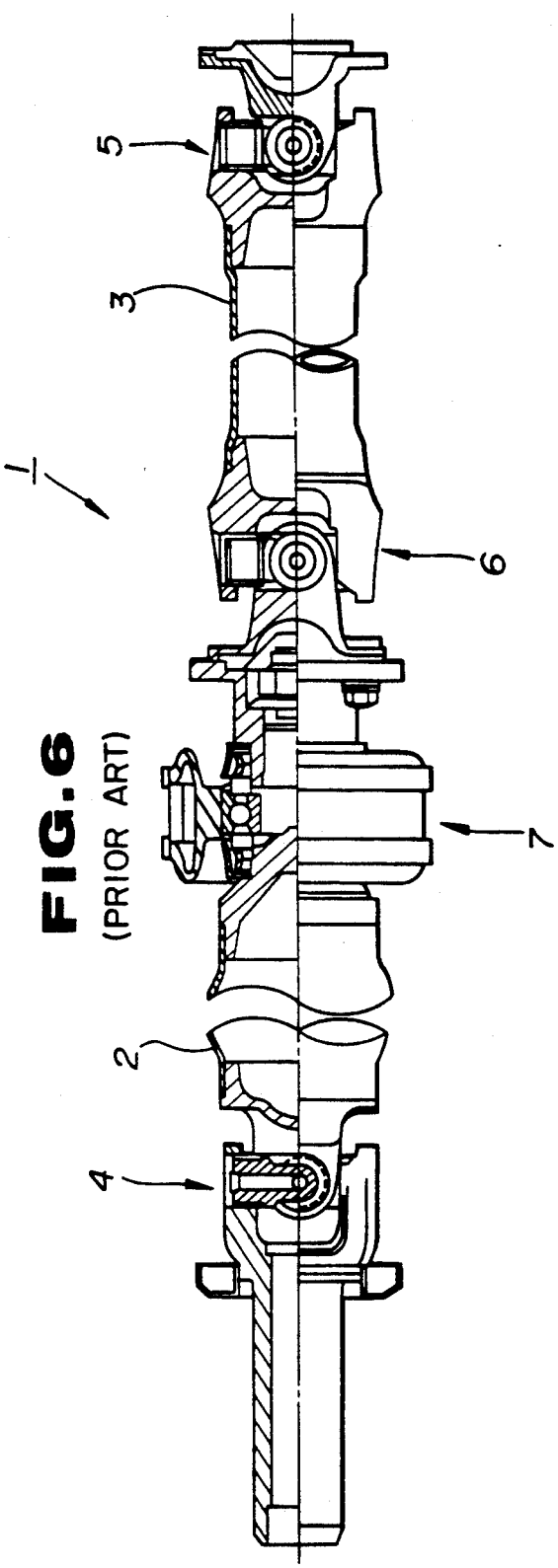
FIG. 6 is a view showing, partly in section, a conventional drive shaft assembly.

FIG. 1 shows a two-piece type drive shaft assembly (or propeller shaft assembly) 1 according to one embodiment of the present invention.

The two-piece type drive shaft assembly 1 of this embodiment includes first and second shafts 2 and 3, and first and second terminal joints 4 and 5. Each of the first and second shafts 2 and 3 is shaped like a body of revolution. In this embodiment, each of the first and second shafts 2 and 3 is a hollow circular cylinder, and extends axially from a first end to a second end. The second end of the first shaft 2 is the left-hand end as viewed in FIG. 1. On the other hand, the second end of the second shaft 3 is the right-hand end as viewed in FIG. 1. In this embodiment, the second (left-hand) end of the first shaft 2 is connected by the first joint 4 with an output shaft of a power plant including engine and transmission of a vehicle. The second (right-hand) end of the second shaft 3 is connected by the second joint 5 with an input shaft of a final (reduction) drive unit of the vehicle. The first ends of the first and second shafts 2 and 3 are drivingly connected with each other by a middle connecting means so that power can be transmitted from one of the first and second shafts 2 and 3 to the other. In this way, this drive shaft assembly 1 transmits a driving power from the engine to driving wheels of the vehicle. Each of the first and second terminal joints 4 and 5 is a universal joint such as a Cardan joint.

The drive shaft assembly 1 further includes a first unbalancing means fixed to the first shaft 2, and a second unbalancing means fixed to the second shaft 3. In this embodiment, the first unbalancing means consists of first and second mass members ma and mb, and the second unbalancing means consists of third and fourth mass members mc and md. The first unbalancing means is located at a first unbalance position of the first shaft 2 which is radially spaced from the center axis of the first shaft 2 and which is intermediate between the first end of the first shaft 2 and a middle of the first shaft 2. The middle of the first shaft 2 is equally distant from the first and second ends of the first shaft 2. The first unbalance position is apart from the middle of the first shaft 2. The distance of the first unbalance position from the middle of the first shaft 2 is smaller than the distance of the first unbalance position from the first end of the first shaft. In this embodiment, the distance between the first unbalance position and the first end of the first shaft 2 is substantially equal to one third of a length of the first shaft 2. Therefore, the distance of the first unbalance position from the middle of the first shaft 2 is greater than one tenth of the length of the first shaft 2. The second unbalancing means is located at a second unbalance position of the second shaft 3 which is determined in the same manner. That is, the second unbalance position is radially spaced from the center axis of the second shaft 3, and intermediate between the first end of the second shaft 3, and a middle of the second shaft 3 which is equally distant from the first and second ends of the second shaft 3. The distance of the second unbalance position from the first end of the second shaft 3 is substantially equal to one third of a length of the second shaft 3, and substantially twice as large as the distance of the second unbalance position from the middle of the second shaft 3. The distance of the second unbalance position from the middle of the second shaft 3 is greater than one tenth of the length of the second shaft 3. In each shaft, the unbalancing means makes one of two half portions of the shaft heavier than the other, if the shaft is divided into the two half portions of equal length by an imaginary bisecting plane which is equidistant from both ends of the shaft.

In this embodiment, the mass (or weight) of the first mass member ma is equal to the mass of the second mass member mb. The third and fourth mass members mc and md are also equal in mass to each other. The first and second mass members ma and mb are fixed to the outside circumferential surface of the first shaft 2, and the third and fourth mass members mc and md are fixed to the outside circumferential surface of the second shaft 3. The center of mass (or the center of gravity) of the system consisting of the first and second mass members ma and mb is distant from the center axis of the first shaft 2, and the center of mass of the system consisting of the third and fourth mass members mc and md is also distant from the center axis of the second shaft 3. In this embodiment, each mass member is fixed to one of the shafts by welding.

In this embodiment, the first and second mass members ma and mb lie on a first imaginary circle in a first imaginary plane which is substantially perpendicular to the center axis of the first shaft 2 and which is separated from the first end of the first shaft 2 by a distance substantially equal to one third of the length of the first shaft 2. The angular distance between the first and second mass members ma and mb is substantially equal to 90 degrees. That is, the angle subtended at the center by the arc of the first circle extending from the position of the first mass member ma to the position of the second mass member mb is substantially a right angle. The third and fourth mass members mc and md lie on a second imaginary circle in a second imaginary plane in the same manner. The angular distance between the third and fourth mass members mc and md is substantially equal to 90 degrees. As shown in FIG. 2C, the four mass members ma, mb, mc and md are circumferentially arranged at equal angular intervals of 90 degrees.

The middle connecting means of this embodiment comprises an elastic member 8 having a tubular shape like a sleeve. The first shaft 2 has a first end portion reduced in diameter, and the second shaft 3 has a first end portion. The first end portion of the first shaft 2 is inserted in the first end portion of the second shaft 3, and the elastic member 8 is interposed between the first end portions of the first and second shafts 2 and 3. The elastic member 8 is fit in the first end portion of the second shaft 3, and fit over the reduced first end portion of the first shaft 2. In this way, the elastic member 8 resiliently connects the first ends of the first and second shafts 2 and 3 so that power can be transmitted from the first shaft 2 to the second shaft 3 and vice versa. The elastic member 8 normally holds the center axes of the first and second shafts 2 and 3 in alignment with each other. The elastic member 8 connects both shafts 2 and 3 end to end so that relative rotation between both shafts is prevented. When the drive shaft assembly 1 is rotating, the elastic member 8 permits a whirling movement of the first end of each of the first and second shafts 2 and 3 to a limited extent.

The first end portion of the second shaft 3 is supported by a center bearing 7 having an elastic member 7a. The center bearing 7 resiliently supports the first end portion of the second shaft 3 to the vehicle body. The elastic member 8 is located within the center bearing 7. The center bearing 7 and the elastic member 8 are centered at the same axial position. The center bearing 7 supports the connecting portion of the shaft assembly at which the first and second shafts 2 and 3 are connected.

Figure 3A:
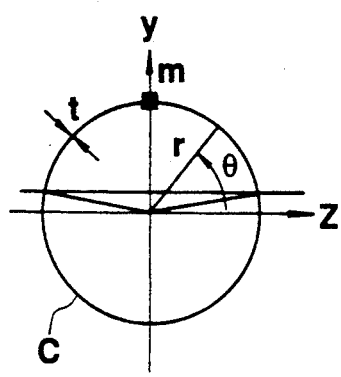
FIGS. 3A, 3B, 4A, 4B and 5 are views for illustrating operations of the drive shaft assembly of the present invention.
Figure 3B:
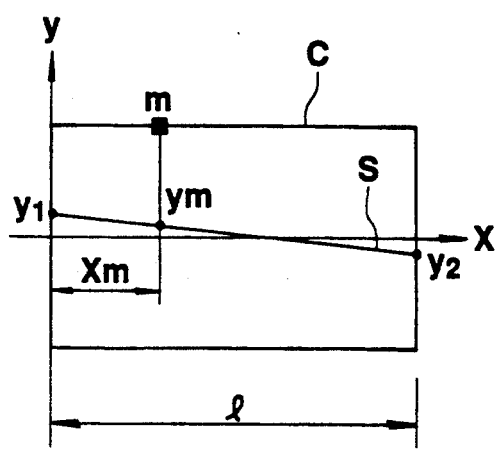

FIGS. 3A, 3B, 4A, 4B and 5 are views for illustrating the theoretical background of the present invention. FIGS. 3A and 3B show a hollow cylindrical body C having the shape of a right circular cylinder. The hollow cylindrical body C has a total length (or height) l, a radius r, and a wall thickness t. This cylindrical body C is rotatable, and both ends of the body C are movable in translational direction. When an amount of unbalance m exists in this cylindrical body C, a principal axis S of inertia of the cylindrical body C deviates from the center axis of the cylindrical body, as explained below.

In FIGS. 3A and 3B, the center axis of the cylindrical body C is placed on the x axis of a three dimensional rectangular cartesian coordinate system, so that the center axis is coincident with the x axis. The cylindrical body C has first and second flat end surfaces which are parallel to each other, and which are perpendicular to the center axis. The first end surface lies in a plane containing the y axis and z axis of the coordinate system. Therefore, each of the outside and inside cylindrical surfaces of the hollow cylindrical body C is generated by rotating a predetermined line about the x axis (the center axis).

The products of inertia $I_{yz}$ and $I_{xz}$ of the cylindrical body C are given by the following equations (1) and (2).

$$I_{yz} = \int yz\,dm = 0 \quad (1)$$

$$I_{xz} = \int xz\,dm = 0 \quad (2)$$

The x-y product of inertia $I_{xy}$ relative to the x and y axes is given by the following equation (3).

$$Ixy = \int xy\,dm \quad (3)$$

$$= \int_0^l \int_0^{2\pi} (r\sin\theta - y)x\rho tr\,d\theta dx +$$

$$(r - y_m)x_m \cdot m = 0$$

In this equation, p (pi) is the ratio of the circumference of a circle to its diameter, r (rho) is the density of material of the cylindrical body C, $y_1$ is a deviation of the principal axis of inertia S of the cylindrical body C from the center axis (x axis) of the cylindrical body C in the first end surface of the cylindrical body C, and $y_2$ is a deviation of the principal axis of inertia S from the center axis in the second end surface. That is, the first end of the principal axis of inertia S is at the distance $y_1$ apart from the first end of the center axis, and the second of the principal axis of inertia S is at the distance $y_2$ apart from the second end of the center axis. In this example, the unbalance m is placed in a plane containing the y axis and x axis. A point $(x_m, y_m)$ is an intersection at which the principal axis of inertia intersects a plane which contains the position of the unbalance m and which is perpendicular to the x axis. The x coordinate (abscissa) of the position of the unbalance m is equal to $x_m$.

Here, we assume that the principal axis of inertia S is a straight line expressed by the following equation (4).

$$y = \frac{y_2 - y_1}{l} x + y_1 \quad (4)$$

This straight line passes through the point $(x_m, y_m)$ lying on the principal axis of inertia S. Therefore, we can obtain the following equation (5).

$$y_m = \frac{y_2 - y_1}{l} x_m + y_1 \quad (5)$$

On the other hand, we can obtain the following equation (6) by expanding the equation (3).

$$\rho tr \int_0^l x \int_0^{2\pi} (r\sin\theta - y)d\theta dx + (r - y_m)x_m \cdot m = 0 \quad (6)$$

$$\rho tr \int_0^l x[-r\cos\theta - y\theta]_0^{2\pi} dx + (r - y_m)x_m \cdot m = 0$$

$$-2\pi\rho tr \int_0^l xy\,dx + (r - y_m)x_m \cdot m = 0$$

Substituting the equations (4) and (5) into the equation (6) and expanding the equation (6) gives the following equation (7).

$$-2\pi\rho tr \int_0^l \left( \frac{y_2 - y_1}{l} x + y_1 \right) x\,dx + \quad (7)$$

$$\left\{ r - \frac{y_2 - y_1}{l} x_m - y_1 \right\} x_m \cdot m = 0$$

$$-2\pi\rho tr \left[ \frac{1}{3} \cdot \frac{y_2 - y_1}{l} x^3 + \frac{1}{2} y_1 x^2 \right]_0^l +$$

-continued $$\left\{ r - \frac{y_2 - y_1}{l} x_m - y_1 \right\} x_m \cdot m = 0$$

$$-2\pi\rho tr \left\{ \frac{1}{3} (y_2 - y_1)l^2 + \frac{1}{2} y_1 l^2 \right\} +$$

$$\left\{ r - \frac{y_2 - y_1}{l} x_m - y_1 \right\} x_m \cdot m = 0$$

$$-\frac{2}{3} \pi\rho tr l^2 y_2 - \frac{1}{3} \pi\rho tr l^2 y_1 + r x_m \cdot m - \frac{x_m^2 \cdot m}{l} y_2 -$$

$$\left( 1 - \frac{x_m}{l} \right) x_m \cdot m y_1 = 0$$

$$\left\{ \frac{1}{3} \pi\rho tr l^2 + \left( 1 - \frac{x_m}{l} \right) x_m M \right\} y_1 +$$

$$\left\{ \frac{2}{3} \pi\rho tr l^2 + \frac{x_m^2 m}{l} \right\} y_2 - r x_m \cdot m = 0$$

Figure 4A:
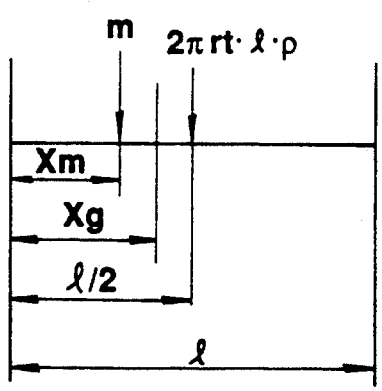

The center of gravity (center of mass) (xg, yg) of the hollow cylindrical body C is determined as follows:

From the balance in a plane containing the center axis, as shown in FIG. 4A, we obtain the following equation (8).

$$\left( \frac{l}{2} - x_g \right) 2\pi r l \rho = (x_g - x_m)m \quad (8)$$

Therefore, the x coordinate xg of the center of gravity is;

$$x_g = \frac{mx_m + \pi r l^2 \rho}{m + 2\pi r l \rho} \quad (9)$$

Figure 4B:
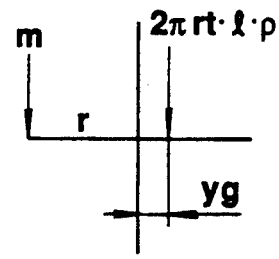

The following equation (10) is obtained from the balance in a plane perpendicular to the center axis, as shown in FIG. 4B.

$$2\pi r l \rho y_g = m(r - y_g) \quad (10)$$

Therefore, the y coordinate yg of the center of gravity is;

$$y_g = \frac{mr}{m + 2\pi r l \rho} \quad (11)$$

The principal axis of inertia S passes through the center of gravity (xg, yg). Therefore, the following equation (12) is obtained from the equations (4), (9) and (11).

$$\frac{y_2 - y_1}{l} x_g + y_1 = y_g \quad (12)$$

$$\therefore \left( 1 - \frac{x_g}{l} \right) y_1 + \frac{x_g}{l} y_2 = y_g$$

-continued $$\frac{1}{l} \frac{m(l - x_m) + \pi r t l^2 \rho}{m + 2\pi r t l \rho} y_1 +$$

$$\frac{1}{l} \frac{m x_m + \pi r t l^2 \rho}{m + 2\pi r t l \rho} y_2 = \frac{mr}{m + 2\pi r t l \rho}$$

$$\therefore \{m(l - x_m) + \pi r t l^2 \rho\} y_1 + (m x_m + \pi r t l^2 \rho) y_2 - mrl = 0$$

Therefore, the deviations $y_1$ and $y_2$ are determined from the equations (7) and (12).

$$y_1 = \frac{BF - CE}{AE - BD} \quad (13)$$

$$y_2 = \frac{CD - AF}{AE - BD} \quad (14)$$

In the equations (13) and (14);

$$A = \frac{1}{3} \pi \rho t r l^2 + \left(1 - \frac{x_m}{l}\right) x_m m$$

$$B = \frac{2}{3} \pi \rho t r l^2 + \frac{x_m^2 \cdot m}{l}$$

$$C = -r x_m \cdot m$$

$$D = m(l - x_m) + \pi \rho t r l^2$$

$$E = m x_m + \pi \rho t r l^2$$

$$F = -mrl$$

As known from the equations (13) and (14), the deviations $y_1$ and $y_2$ are both equal to zero if the unbalance m is nonexisting. In this ideal case, the cylindrical body can silently rotate about its own center axis without whirling motion. When there exists the unbalance m as in actual rotating shafts, the deviations $y_1$ and $y_2$ are not equal to zero, and the cylindrical body C becomes a source of whirling vibration.

Figure 5:
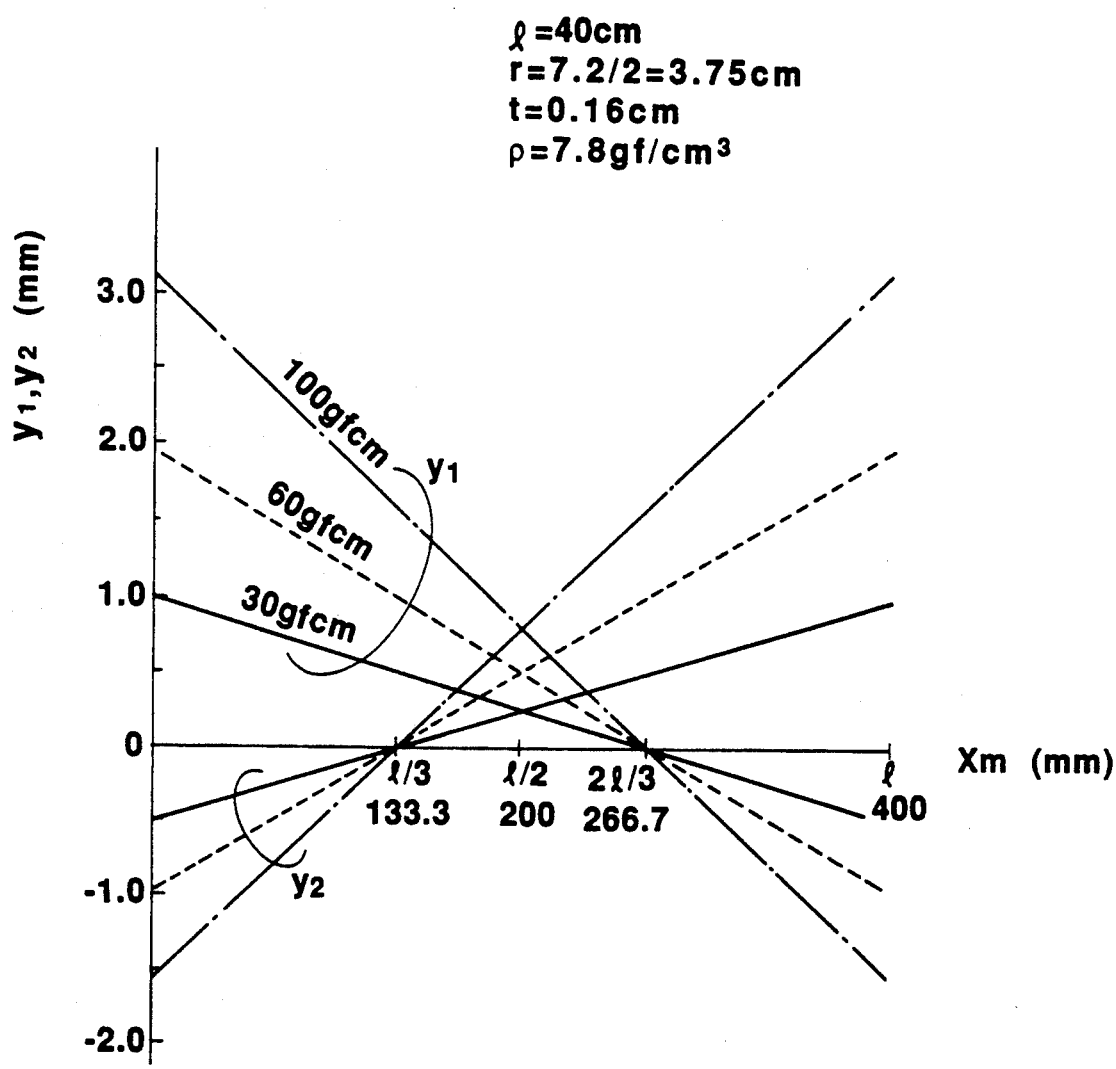

FIG. 5 shows a relationship of each of the deviations $y_1$ and $y_2$ with respect to the x coordinate $x_m$ of the position of the unbalance m. In this example, l=40 cm, r=3,75 cm, t=0.16 cm and r=7.8 gf/cm³. The amount of unbalance m is set equal to each of 30 gfcm (solid line), 60 gfcm (broken line) and 100 gfcm (one dot chain line).

As shown in FIG. 5, each of the deviations $y_1$ and $y_2$ is varied in accordance with the position xm of the unbalance m, and either of the deviations $y_1$ and $y_2$ becomes equal to zero at a certain position, independently of the mass of the unbalance m. The deviation $y_2$ of the second end of the principal axis of inertia S is zero or negligible when the unbalance m lies in or near a first trisecting plane which is perpendicular to the center axis of the cylinder body C and which is apart from the first end surface of the cylindrical body C at the distance which is equal to one third of the total length l of the cylindrical body C. The deviation $y_1$ is zero or negligible when the unbalance m lies in or near a second trisecting plane which is perpendicular to the center axis of the cylindrical bod C and which is separated from the second end surface by the distance equal to one third of the total length l. The clindrical body C is divided into three parts of equal length if the cylindrical body C is cut by the first and second trisecting planes.

Figure 2A:
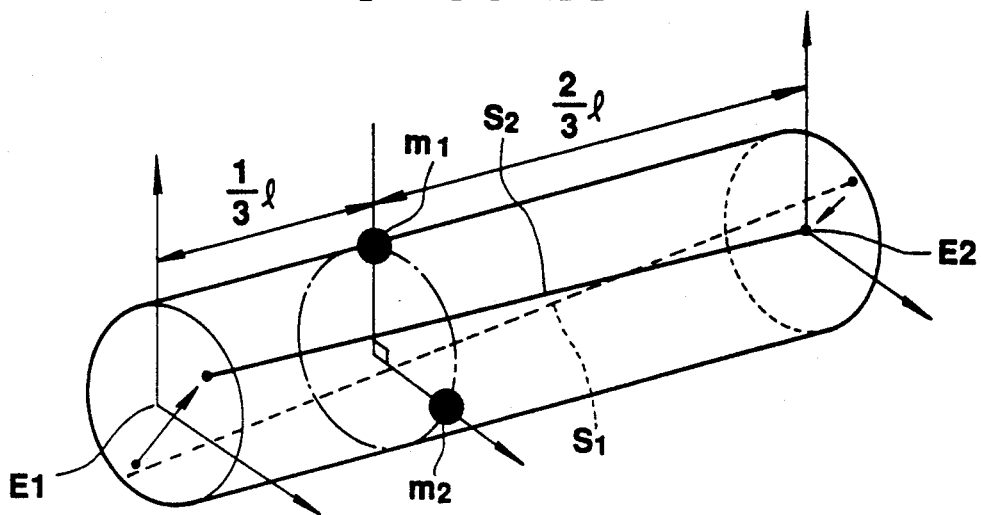
FIG. 2A is a view schematically showing one of shafts of the drive shaft assembly shown in FIG. 1.

FIG. 2A schematically shows the shaft 2 or 3 of the drive shaft assembly 1 of the embodiment shown in FIG. 1. The shaft 2 or 3 shown in FIG. 2A has an outside cylindrical surface which is a curved surface of a right circular cylinder having a first circular end surface (base or top) whose center lies at a point E1, and a second circular end surface (base or top) whose center lies at a point E2. In each of the shafts 2 and 3, the two mass members m1 and m2 (ma and mb, or mc and md) are positioned in or near the first trisecting plane which is perpendicular to the center axis extending from the first end center E1 to the second end center E2. The distance between the first trisecting plane and the first end surface is equal to the distance between the first and second end surfaces, divided by three. Therefore, as the rotational speed of the shaft becomes high, the principal axis of inertia S1 of the shaft approaches a straight line segment S2 whose first end is apart from the first end center E1, but whose second end lies at the second end center E2 of the shaft 2 or 3. In this embodiment, the mass members are fixed at such positions that the principal axis of inertia of the shaft approaches the straight line which intersects the center axis of the shaft at the second end of the shaft. Therefore, the second end of the shaft rotates silently with no whirling motion because the second end of the principal axis of inertia S2 lies on the center axis. On the other hand, the first end of the shaft 2 or 3 rotate with whirling motion, in the disassembled state shown in FIG. 2A.

Figure 2B:
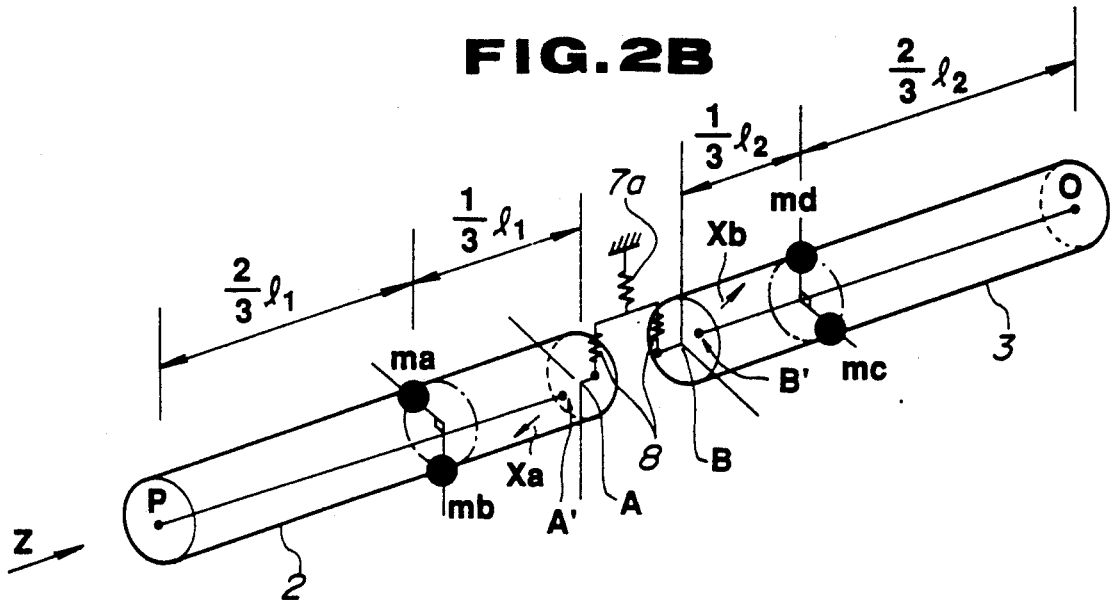
FIG. 2B is a view schematically showing the drive shaft assembly shown in FIG. 1.
Figure 2C:
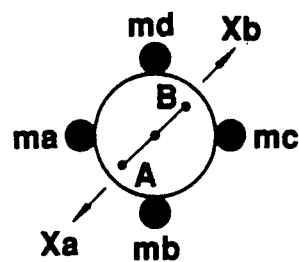
FIG. 2C is a view of the drive shaft assembly of FIG. 2B, taken in a direction shown by an arrow Z in FIG. 2B.

FIG. 2B schematically shows the drive shaft assembly 1 of the embodiment. FIG. 2C is a schematic end view of the drive shaft assembly 1 as viewed in the axial direction Z in FIG. 2B. In the second end of the first shaft 2, the principal axis of inertia of the shaft 2 passes through the point P lying on the center axis of the shaft 2. In the second end of the second shaft 3, the principal axis of the inertia of the shaft passes through the point Q lying on the center axis of the shaft 3. Therefore, the drive shaft assembly 1 of the embodiment can prevent whirling motion in the second end of each shaft 2 or 3 which is the shaft end remoter from the other shaft.

In the first end of the first shaft 2, the end A' of the principal axis of inertia is apart from the end A of the center axis. In the first end of the second shaft 3, the end B' of the principal axis of inertia is apart from the end B of the center axis. Therefore, the first end of each shaft 2 or 3 whirls and causes elastic deformation in the elastic members 8 and 7a.

In this embodiment, the first and second mass members ma and mb are positioned in the first trisecting plane in such a manner that a straight line extending from the center axis to the first mass member ma forms a right angle with a straight line extending from the center axis to the second mass member mb. The third and fourth mass members mc and md are positioned in the first trisecting plane of the second shaft 3 so that a straight line extending from the center axis to the third mass member mc forms a right angle with a straight line extending from the center line to the fourth mass member md. Furthermore, the four mass members ma, mb, mc and md are arranged at regular intervals in the circumferential direction as shown in FIG. 2C. As shown in FIG. 2C, the first and third mass members ma and mc are placed in a first imaginary orthogonal plane which is horizontal in FIG. 2C and which extends so as to silver the shaft assembly. The second and fourth mass members mb and md are placed in a second orthogonal plane which intersects the first orthogonal plane substantially at right angles along an intersecting line extending from the second end of the first shaft 2 to the second end of the second shaft 3. The four mass members are arranged symmetrically about the rotation axis of the shaft assembly 1, as viewed in FIG. 2C. When the drive shaft assembly 1 is rotating to transmit power, a centrifugal force acts on each of the mass members ma, mb, mc and md. A resultant Xa of the centrifugal forces acting on the first and second mass members ma and mb has a direction which is perpendicular to the axis of rotation, and which bisects the angle between the directions of the centrifugal forces of the first and second mass members ma and mb. Similarly, a resultant Xb of the centrifugal forces of the third and fourth mass members mc and md acts in a direction which intersects the axis of rotation at right angles and which passes through a middle point between the third and fourth mass members mc and md. In this embodiment, the four mass members ma, mb, mc and md are arranged in a circle, when they are viewed in the axial direction, in such a manner that the resultant vector Xa and the resultant vector Xb act in opposite directions, and cancel each other, as shown in FIG. 2C. Therefore, the principal axes of inertia of the first and second shafts 2 and 3 are deviated in opposite directions, and the whirling motion of the first end of the first shaft 2 becomes opposite in phase to the whirling motion of the first end of the second shaft 3. Thus, the drive shaft assembly 1 of this embodiment can minimize undesired whirling vibrations.

The magnitude of the centrifugal force acting on each mass member is dependent on the distance from the axis of rotation, and the whirling motion of the shaft end is influenced by the length of the shaft. Therefore, in order to cause the resultant vectors Xa and Xb to completely counterbalance each other, it is necessary to determine the mass of the first and second mass members ma and mb, and the mass of the third and fourth mass members mc and md in accordance with the shaft length and shaft diameter.

In this way, the drive shaft assembly 1 of this embodiment can prevent or minimize whirling motion at each end of each shaft, and thereby reduce the levels of vehicle body vibration and noise confined in the passenger compartment of the vehicle. The mass members of this embodiment are arranged at equal angular intervals. Therefore, the shaft assembly 1 of this embodiment holds a static balance, and facilitates the accurate positioning of the mass members. The drive shaft assembly of the present invention eliminates the necessity for accurately correcting unbalance of each shaft, and thereby contributes to the reduction of manufacturing cost.

The total mass of the two mass members of each shaft is sufficiently greater than the amount of unbalance residing in the shaft 2 or 3. The total mass of the two mass members is set equal to such a value that the axis of inertia of the shaft receives no or little influence from the inherent unbalance of the shaft, but the axis of inertia is shifted only by the influence of the intentionally added unbalance mass members.

If, for example, a concentrated unbalance amount of 30 gcm exists at the middle of a shaft, it is necessary to attach a mass member of 40 gcm to the shaft in order to attain a balance between a moment produced by the inherent unbalance and a moment produced by the mass member which is axially separated from the position of the unbalance. Therefore, it is possible to shift the principal axis of inertia of the shaft to a desired position by adding the mass member from about 80 to about 120 gcm. In this case, the weight of the mass member is 10–15 g if the diameter of the shaft is 80 mm.

What is claimed is:

1. A drive shaft assembly comprising first and second shafts each of which has first and second ends;
    a connecting means for resiliently connecting said first ends of said first and second shafts with each other so that power can be transmitted from one of said first and second shaft to the other;
    a first unbalancing means fixed to said first shaft, said first unbalancing means being located at a first unbalance position of said first shaft, said first unbalance position being radially spaced from a center axis of said first shaft, said first unbalance position being separated from said first end of said first shaft by a distance which is substantially equal to one third of the length of said first shaft; and
    a second unbalancing means fixed to said second shaft, said second unbalancing means being located at a second unbalance position of said second shaft, said second unbalance position being radially spaced from a center axis of said second shaft, said second unbalance position being separated from said first end of said second shaft by a distance which is substantially equal to one third of the length of said second shaft,
    wherein said first unbalancing means is fixed to said first shaft so as to make a principal axis of inertia of said first shaft approximate an inclined straight line which intersects said center axis of said first shaft at said second end of said first shaft and which is apart from said center axis of said first shaft at said first end of said first shaft, and said second unbalancing means is fixed to said second shaft so as to make a principal axis of inertia of said second shaft approximate an inclined straight line which intersects said center axis of said second shaft at said second end of said second shaft and which is apart from said center axis of said second shaft at said first end of said second shaft.

2. A drive shaft assembly according to claim 1 wherein each of said first and second unbalancing means has a predetermined mass, and is used solely because of the predetermined mass, said first unbalancing means being positioned so that a center of mass of said first unbalancing means is distant from said center axis of said first shaft, and said second unbalancing means being positioned so that a center of mass of said second unbalancing means is distant from said center axis of said second shaft.

3. A drive shaft assembly according to claim 2 wherein said first unbalancing means is fixed to said first shaft so that said center of mass of said first unbalancing means is located at said first unbalance position, and said second unbalancing means is fixed to said second shaft so that said center of mass of said second unbalancing means is located at said second unbalance position.

4. A drive shaft assembly according to claim 3 wherein said connecting means comprises an elastic member which resiliently connects said first and second shafts end to end so that power can be transmitted through said elastic member from one of said first and second shafts to the other shaft.

5. A drive shaft assembly according to claim 3 wherein said first unbalancing means is placed in a first imaginary plane which is substantially perpendicular to said center axis of said first shaft and which is separated from said first end of said firstshaft by a distance which is substantially equal to one third of a length of said first shaft, and said second unbalancing means is placed in a second imaginary plane which is substantially perpendicular to said center axis of said second shaft and which is separated from said first end of said second shaft by a distance which is substantially equal to one third of a length of said second shaft.

6. A drive shaft assembly according to claim 5 wherein said first unbalancing means comprises first and second mass members separated from each other, and said second unbalancing means comprises third and fourth mass members separated from each other, said first and second mass members are located, respectively, on two imaginary straight lines which lie in said first imaginary plane and which intersect each other substantially at right angles at a point lying on said center axis of said first shaft, and said third and fourth mass members are located, respectively, on two imaginary straight lines which lie in said second imaginary plane and which intersect each other substantially at right angles at a point lying on said center axis of said second shaft.

7. A drive shaft assembly according to claim 6 wherein said first and second mass members are fixed to an outside circumferential surface of said first shaft, and said third and fourth mass members are fixed to an outside circumferential surface of said second shaft.

8. A drive shaft assembly according to claim 7 wherein said connecting means comprises an elastic member which has a tubular shape, one of said first and second shafts being fit in said elastic member and the other of said first and second shafts being fit over said elastic member.

9. A drive shaft assembly according to claim 5 wherein said first and second unbalancing means are positioned so that a centrifugal force acting on said first unbalancing means and a centrifugal force acting on said second unbalancing means have opposite directions.

10. A drive shaft assembly according to claim 9 wherein said connecting means comprises an elastic member which connects said first ends of said first and second shafts in such a manner that said center axes of said first and second shafts are normally held in line with each other, and a relative rotation between said first and second shaft is prevented.

11. A drive shaft assembly according to claim 9 wherein said first unbalancing means comprises first and second mass members which are equal in mass, and said second unbalancing means comprises third and fourth mass members which are equal in mass, said first and second mass members being positioned on a first imaginary circle whose center lies on said center axis of said first shaft, an angle subtended at the center of said first circle by an arc of said first circle extending between the positions of said first and second mass members being substantially a right angle, said third and fourth mass members being positioned on a second imaginary circle whose center lies on said center axis of said second shaft, an angle subtended at the center of said second circle by an arc of said second circle extending between the positions of said third and fourth mass members being substantially a right angle.

12. A drive shaft assembly according to claim 11 wherein said first and third mass members are located on a first imaginary orthogonal plane, and said second and fourth mass members are located on a second imaginary orthogonal plane which intersects said first orthogonal plane substantially at right angles along an intersecting line extending from said second end of said first shaft to said second end of said second shaft, said first orthogonal plane extending between said second and fourth mass members, and said second orthogonal plane extending between said first and third mass members.

13. A drive shaft assembly according to claim 11 wherein said connecting means includes a means which connects said first ends of said first and second shafts with each other in such a manner as to permit a whirling movement of said first end of each of said first and second shafts to a limited extent, and said first and second unbalancing means are positioned in such a manner as to cause said first ends of said first and second shafts to make whirling movements of opposite phase.

14. A drive shaft assembly according to claim 11 wherein said first, second, third and fourth mass members are arranged at equal angular intervals in a circumferential direction.

* * * * *